Jan. 29, 1929. 1,700,493
J. A. GUAY
FRICTION CLUTCH
Filed Jan. 4, 1926
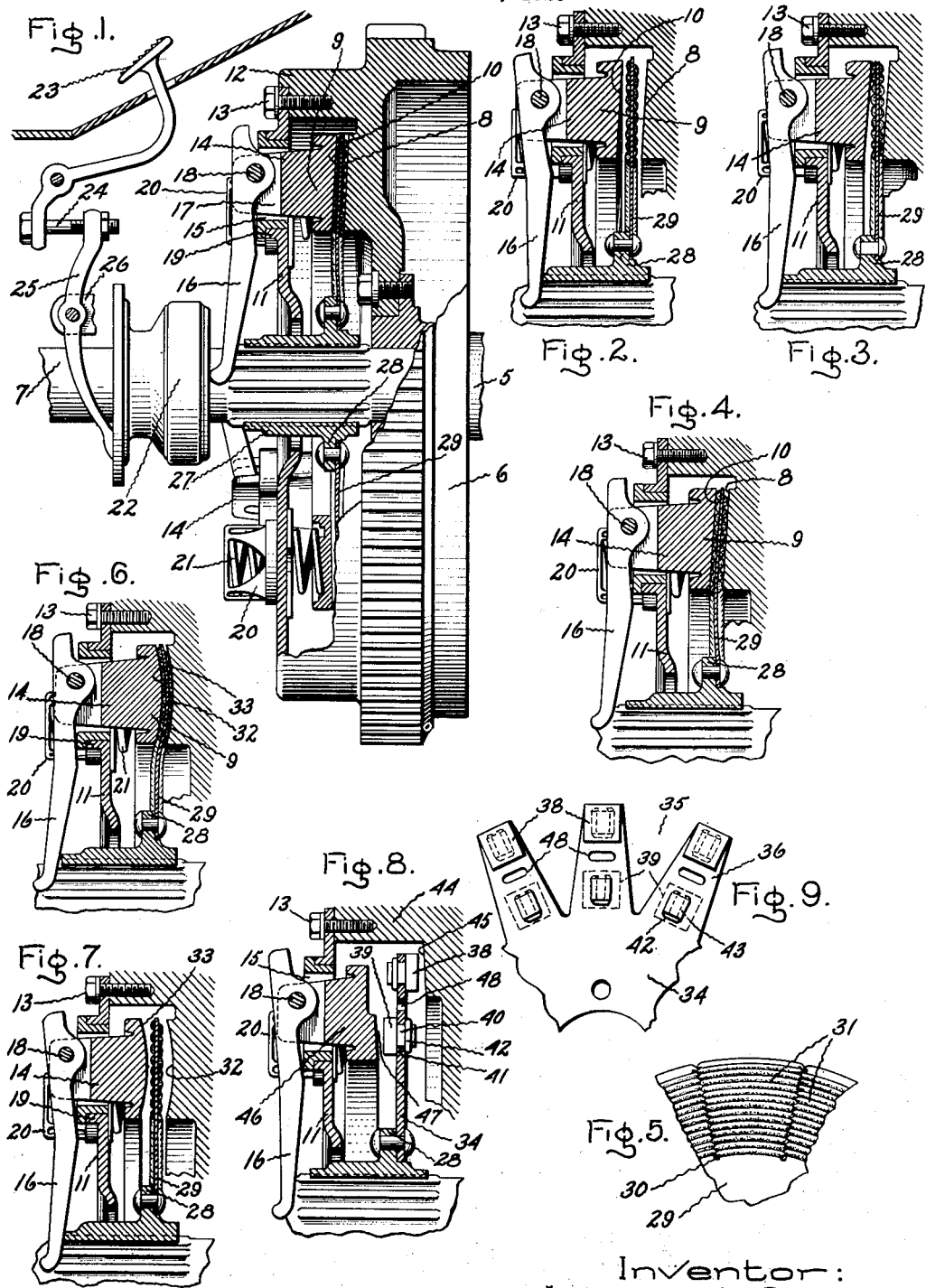
Inventor:
Joseph A. Guay.
by Alfred E. Bobst
His Attorney.

Patented Jan. 29, 1929.

1,700,493

UNITED STATES PATENT OFFICE.

JOSEPH ARTHUR GUAY, OF LYNN, MASSACHUSETTS, ASSIGNOR TO CHRISTOPHER HAIGH, OF WINTHROP, MASSACHUSETTS.

FRICTION CLUTCH.

Application filed January 4, 1926. Serial No. 79,102.

The present invention relates to friction clutches such as are used in connection with automobiles, for example, for connecting the driving shaft to the driven shaft, and especially to friction clutches of the type wherein a clutch plate or disk on the one shaft is adapted to be clamped between opposed friction surfaces on parts carried by the other shaft, said parts being biased toward each other, usually, by strong clutch springs. In such clutches, the clutch is thrown to "out" position by moving one part away from the other against the action of the clutch springs to release the clutch plate or disk, and it is let in again by releasing such part and permitting it to be forced back again by the clutch springs to a position wherein the clutch disk is again clamped between the friction surfaces. In the more usual automobile structure, one friction surface is formed on the fly wheel and the other is formed on a clutch ring movable toward and away from the fly wheel.

In connection with such clutches, it is desirable that the clutch be capable of being let in gradually, that is, that when being let in, it take hold gradually so that the driven shaft will be put into motion smoothly. As is well known, if a clutch when let in takes hold quickly, it, in the case of an automobile, starts the automobile with a jerk and sometimes causes stalling of the engine.

An object of my invention is to provide an improved clutch structure which when let in will take hold gradually whereby the driving shaft will start the driven shaft smoothly and evenly.

A further object of my invention is to provide an improved clutch structure wherein an appreciable movement of the clutch parts takes place between the position of the parts when the clutch first takes hold and their position when the clutch is fully in whereby it becomes an easy matter to let the clutch in gradually and smoothly.

A further object of my invention is to provide an improved clutch plate or disk which may be used as a part of my improved clutch structure.

For a consideration of what I believe to be novel and my invention, attention is directed to the following specification and the claims appended thereto.

According to my invention, I so construct the clutch that the friction clutch surfaces between which the clutch disk is clamped do not come into contact with the clutch disk simultaneously over their entire surfaces but rather come into contact therewith gradually whereby they slowly and evenly take hold of the clutch disk. In other words, when the clutch is let in, the friction surfaces engage with the clutch plate first over a limited area and then over a gradually increasing area until in complete engagement.

In the drawing, Fig. 1 is a side view, partly in section, of a clutch structure embodying my invention; Figs. 2, 3 and 4 are detail views in section, showing the clutch "out", "partly in" and "fully in", respectively; Fig. 5 is a detail face view of a part of the clutch plate shown in Figs. 1 to 4; Figs. 6 and 7 are detail sectional views of a modification, Fig. 6 showing the clutch in "in" position and Fig. 7 showing it in "out" position; Fig. 8 is a detail sectional view of a further modification, and Fig. 9 is a face view of a part of the clutch plate shown in Fig. 8.

Referring to the drawing, 5 indicates a driving shaft, for example, the crank shaft of an automobile, 6 a fly wheel carried thereby, and 7 a driven shaft which in the case of an automobile is the shaft through which the wheels are driven. On the fly wheel is a friction surface 8 and adjacent thereto is a friction clutch ring 9 having a cooperating friction surface 10. Clutch ring 9 is carried by and is driven by a cover plate 11 which is attached to a flange 12 on the fly wheel by a ring of studs 13. The connection of ring 9 to cover plate 11 is through the intermediary of a plurality of spaced posts 14 on the ring which project through openings 15 in the cover plate and have operating arms 16 pivotally connected to them at their outer ends, the arms being pivoted in slots 17 in the ends of the posts by means of pins 18. Surrounding openings 15 are collars 19 which serve as fulcrums for operating arms 16. Carried by the cover plate are a plurality of circumferentially spaced spring cages 20 in which are located clutch springs 21, the springs engaging the ends of the cages at one end and clutch ring 9 at the other end. These springs serve to force clutch ring 9 toward the fly wheel. On driven shaft 7 is a member 22 adapted to be moved by a foot pedal 23 to force the inner ends of arms 16 axially inward and thus move clutch ring 9 away from friction surface 8 to throw the clutch to "out" position. When arms 16 are moved inward they fulcrum on the edges of collars 19. Foot pedal 23 is connected to member 22 by a bolt 24 and a forked lever 25 which is pivoted on a bracket 26. Splined on shaft 7 is a sleeve 27 having a flange 28 to which is attached a clutch plate 29, the peripheral edge or portion of which stands between friction surfaces 8 and 10.

The general clutch structure arrangement so far described is shown only by way of example and is to be taken as typical of any suitable clutch construction embodying two parts having friction surfaces between which a clutch plate is adapted to be clamped.

According to the embodiment of my invention shown in Figs. 1 to 5 inclusive, I construct the friction clutch in a manner such that while the friction clutch faces 8 and 10 are parallel to each other, they are not parallel to the clutch plate 29 when the clutch is in "out" position, but extend at an angle to the plane of the clutch plate. The clutch plate is a flat disk and may be of any suitable structure. I may with advantage use a clutch plate of the type disclosed in Patent No. 1,493,433, dated May 6, 1924, granted to E. J. Guay and myself. Such clutch plate comprises a metal disk provided with radially extending slots 30 through which strands of friction surfacing material 31 are woven back and forth. A clutch plate of this type is particularly well adapted for use in a clutch structure embodying my invention because of the fact that its peripheral portion has a certain amount of flexibility.

Referring to Fig. 2, wherein the clutch is shown as being in "out" position, it will be seen that clutch plate 29 is a flat disk and normally stands with its surfaces at a right angle to shaft 7. It will be seen also, that friction surfaces 8 and 10 are parallel to each other but extend at an angle to the surfaces of plate 29. As the clutch is let in, the parts will first assume the positions shown in Fig. 3, the inner edge of friction surface 8 and the outer edge of friction surface 10 coming into engagement with the clutch plate. The clutch will begin then to take hold gradually as ring 9 moves toward surface 8, the plate 29 bending as surfaces 8 and 10 approach each other. When the clutch is fully in, the parts assume the positions shown in Fig. 4, the peripheral portion of the clutch plate being bent as shown, so that the entire surfaces 8 and 10 are in contact with it. As will be clear from a consideration of Figs. 2, 3 and 4, clutch ring 9 is required to move an appreciable distance after friction surfaces 8 and 10 first engage clutch plate 29 before the clutch is fully in, and during this movement, the area of contact and the friction between the surfaces is increasing gradually. As a result, driven shaft 7 will be put into motion gradually and evenly.

In carrying out my invention, it will be seen that I utilize a perfectly flat clutch plate, and that I modify only the planes of the friction surfaces on the fly wheel and the clutch ring. This is an important consideration because a flat clutch disk is the easiest and best type to build or manufacture and can be made at the lowest cost. At the same time, it is a relatively easy matter to modify the planes of the friction surfaces so that they extend at the desired angle.

As stated above, a clutch plate as shown in the patent referred to, is slotted radially, and as a result it has a certain amount of flexibility. This permits it to bend readily after the manner shown in Fig. 4 and without injury to it. It is, of course, necessary that the clutch plate used be capable of being bent after the manner shown, and I have found a radially slotted clutch plate to be especially advantageous in carrying out my invention. This is because the radial slotting serves to give to the clutch plate a limited amount of flexibility and to permit it to bend readily. At the same time, however, it has the desired amount of stiffness to give the required driving engagement when the clutch is being let in. In this connection, it will be understood that the clutch plate must have sufficient stiffness so that considerable driving action takes place when the clutch is partially in.

In Figs. 6 and 7, I have shown a modification of my invention wherein the friction clutch surfaces 32 and 33, corresponding to friction clutch surfaces 8 and 10 of Figs. 1 to 5, are curved, one being concave and the other convex. The curvature of the surfaces is such that they will nest one in the other. Otherwise the structure shown in Figs. 6 and 7 is the same as that of Figs. 1 to 5. The operation of this modification will be obvious from an inspection of Figs. 6 and 7, it being clear that as the clutch ring moves from the position shown in Fig. 7 to that shown in Fig. 6, the clutch plate will be engaged gradually by the friction surfaces.

In Figs. 8 and 9, I have shown a modified form of clutch plate and also a somewhat different arrangement of friction surfaces. The clutch plate comprises a disk 34 which is slotted as is indicated at 35 to provide a plurality of spaced fingers 36. Attached to the outer ends of fingers 36 on one side are buttons 38 of any suitable contour. In the present instance, they are shown as being rectangular. Buttons 38 may be made from any suitable material, a material which is smooth, which has a comparatively even coefficient of friction under varying operating conditions, and which wears well being preferred. Preferably, the buttons are formed of a metallic substance. A suitable material is an alloy such as that disclosed in the patent to Gilson, No. 1,177,407, dated March 28, 1916 and known to the trade as "Genelite".

Attached to the radially inner ends of fingers 36 and on the side of them opposite to buttons 38 are similar buttons 39. Buttons 38 and 39 may be fastened in place in any suitable manner, it being preferable that they be fastened in a manner such that they may have a limited amount of play or movement. In the present instance, the buttons have stems or shanks 40 which project loosely through openings 41 in the fingers and are fastened in position by U-shaped spring fasteners 42 which lie in grooves 43 in stems 40.

Fly wheel 44 has a friction surface 45 and the clutch ring 46, corresponding to clutch ring 9 of Figs. 1 to 5, has a friction surface 47. Friction surfaces 45 and 47 are parallel to each other but extend at an angle to the friction surfaces of buttons 38 and 39. Also friction surfaces 45 and 47 are not in alignment with each other, friction surface 45 being in line with buttons 38 and friction surface 47 being in line with buttons 39. In fingers 36 between buttons 38 and 39 are slots 48 which serve to lend flexibility to the fingers.

Aside from the arrangement of the friction surfaces and the clutch plate, the structure shown in Figs. 8 and 9 is indicated as being the same as that shown in Figs. 1 to 4.

In Fig. 8, the clutch is shown as being in "out" position. As it is let in, it will be seen that first the outer edge of friction surface 45 will engage the outer edges of buttons 38 and the inner edge of friction surface 47 will engage the inner edges of buttons 39. Following this, as ring 46 moves toward the fly wheel, fingers 36 will be bent, thereby effecting gradual engagement of friction surfaces 45 and 47 with the surfaces of buttons 38 and 39. The total movement of ring 46 toward the fly wheel may be limited in any suitable manner. In the present instance, it is limited by the operating arms 16 engaging collars 19. As will be clear, with this arrangement, the clutch will take hold gradually and evenly when let in the same as with the other arrangements described.

In accordance with the patent statutes, I have described the principle of operation of my invention, together with apparatus which I now consider to represent the best embodiments thereof, but I desire to have it understood that the apparatus shown are only illustrative and that the invention may be carried out by other means.

What I claim as new and desire to secure by Letters Patent of the United States, is:—

1. A clutch plate comprising a disk having radially extending slots which form fingers, friction members attached to the fingers at their outer ends on one side of the fingers, and friction members attached to the fingers at their inner ends and on the other side of the fingers.

2. A clutch plate comprising a disk having radially extending fingers, friction members attached to the fingers at their outer ends on one side of the fingers, and friction members attached to the fingers at their inner ends and on the other side of the fingers, said fingers having slots between said friction members to render the fingers flexible.

3. The combination with a driving shaft and a driven shaft, of a clutch structure for connecting them, said structure comprising a clutch plate on one shaft having projecting means on opposite sides which provide friction surfaces, the projecting means on one side being out of line with the projecting means on the other side, and parts on the other shaft having friction surfaces for engaging the first named friction surfaces, said second named friction surfaces extending at an angle to the first named friction surfaces.

4. The combination with a driving shaft and a driven shaft, of a clutch structure for connecting them, said structure comprising a clutch plate having radially extending slots therein, on one shaft, projecting means on opposite sides of the plate which provide friction surfaces, the projecting means on one side being out of line with the projecting means on the other side, and parts on the other shaft having friction surfaces for engaging the first named friction surfaces, said second named friction surfaces extending at an angle to the first named friction surfaces.

In witness whereof, I have hereunto set my hand this 10th day of December, 1925.

JOSEPH ARTHUR GUAY.